United States Patent [19]

Gergen et al.

[11] 4,085,163
[45] Apr. 18, 1978

[54] MULTICOMPONENT POLYAMIDE-BLOCK COPOLYMER-POLYMER BLENDS

[75] Inventors: William P. Gergen; Sol Davison, both of Houston, Tex.

[73] Assignee: Shell Oil Company, Houston, Tex.

[21] Appl. No.: 790,125

[22] Filed: Apr. 22, 1977

Related U.S. Application Data

[63] Continuation-in-part of Ser. No. 693,462, Jun. 7, 1976, Pat. No. 4,041,103.

[51] Int. Cl.$^2$ ............................................. C08L 75/00
[52] U.S. Cl. ........................... 260/857 D; 260/857 R; 260/857 PE; 260/857 L; 260/857 UN; 260/857 F
[58] Field of Search ........ 260/857 D, 857 PE, 857 R, 260/857 L, 859 R, 857 UN, 857 F

[56] References Cited

U.S. PATENT DOCUMENTS

| | | | |
|---|---|---|---|
| 3,546,319 | 12/1970 | Prevorsek | 260/857 D |
| 3,595,942 | 7/1971 | Wald | 260/880 B |
| 3,694,523 | 9/1972 | Rollmann | 260/880 B |
| 3,842,029 | 10/1974 | Saito et al. | 260/857 D |

*Primary Examiner*—Paul Lieberman
*Attorney, Agent, or Firm*—Dean F. Vance

[57] ABSTRACT

A multicomponent polymer blend composition is prepared by intimately mixing a polyamide, a selectively hydrogenated monoalkenyl arene-diene block copolymer, and at least one dissimilar engineering thermoplastic resin under such conditions that at least two of the polymers form at least partial continuous network phases which interlock with the other polymer networks and therefore results in a desirable balance of properties.

31 Claims, No Drawings

MULTICOMPONENT POLYAMIDE-BLOCK COPOLYMER-POLYMER BLENDS

This application is a continuation-in-part of applicants copending application Ser. No. 693,462, filed June 7, 1976, now U.S. Pat. No. 4,041,103.

BACKGROUND OF THE INVENTION

Engineering thermoplastics are a group of polymers that possess a balance of properties comprising strength, stiffness, impact resistance, and long term dimensional stability that make them useful as structural materials. Engineering thermoplastics are especially attractive as replacements for metals because of the reduction in weight that can often be achieved as, for example, in automotive applications.

For a particular application, a single plastic may not offer the combination of properties desired and, therefore, means to correct this deficiency are of interest. One particularly appealing route is through blending together two or more polymers (which individually have the properties sought) to give a material with the desired combination of properties. This approach has been successful in limited cases such as in the improvement of impact resistance for plastic, e.g. polystyrene, polypropylene, poly(vinyl chloride), etc., using special blending procedures or additives for this purpose. However, in general, blending of plastics has not been a successful route to enable one to combine into a single material the desirable individual characteristics of two or more polymers. Instead, it has often been found that such blending results in combining the worst features of each with the result being a material of such poor properties as not to be of any practical or commercial value. The reasons for this failure are rather well understood and stem in part from the fact that thermodynamics teaches that most combinations of polymer pairs are not miscible, although a number of notable exceptions are known. More importantly, most polymers adhere poorly to one another. As a result, the interfaces between component domains (a result of their immiscibility) represent areas of severe weakness in blends and, therefore, provide natural flaws and cracks which result in facile mechanical failure. Because of this, most polymer pairs are said to be "incompatible". In some instances the term compatibility is used synonymously with miscibility, however, compatibility is used here in a more general way that describes the ability to combine two polymers together for beneficial results and may or may not connote miscibility.

One method which may be used to circumvent this problem in polymer blends is to "compatibilize" the two polymers by blending in a third component, often referred to as a "compatibilizing agent", that possesses a dual solubility nature for the two polymers to be blended. Examples of this third component most typically are obtained in block or graft copolymers. As a result of this characteristic, this agent locates at the interface between components and greatly improves interphase adhesion and therefore increases stability to gross phase separation.

The present invention covers a means to stabilize multipolymer blends that is independent of the prior art compatibilizing process and is not restricted to the necessity for restrictive dual solubility characteristics. The materials used for this purpose are special block copolymers capable of thermally reversible selfcross-linking. Their action in the present invention is not that visualized by the usual compatibilizing concept as evidenced by the general ability of these materials to perform similarly for a wide range of blend components which do not conform to the solubility requirements of the previous concept.

SUMMARY OF THE INVENTION

A novel composition has now been found that exhibits excellent dimensional stability and integrity. The composition broadly comprises the admixture obtained by intimately mixing about 4 to about 40 parts by weight of a block copolymer, about 5 to about 48 parts by weight of at least one dissimilar engineering thermoplastic, and a polyamide in a weight ratio of polyamide to dissimilar engineering thermoplastic of greater than 1:1 so as to form a polyblend wherein at least two of the polymers form at least partial continuous interlocked networks with each other, and wherein:

(a) said block copolymer comprises at least two monoalkenyl arene polymer end blocks A and at least one substantially completely hydrogenated conjugated diene polymer mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000;

(b) said polyamide has a number average molecular weight in excess of about 10,000; and (c) said dissimilar engineering thermoplastic resin is capable of forming a continuous network structure, and is selected from the group consisting of polyolefins, thermoplastic polyesters, poly(aryl ethers), poly(aryl sulfones), polycarbonates, acetal resins, thermoplastic polyurethanes, halogenated thermoplastics, and nitrile barrier resins.

The block copolymer of the instant invention effectively acts as a mechanical or structural stabilizer which interlocks the various polymer structure networks and prevents the consequent separation of the polymers during processing and their subsequent use. As defined more fully hereinafter, the resulting structure of the instant polyblend (short for "polymer blend") is that of at least two partial continuous interlocking networks. This interlocked structure results in a dimensionally stable polyblend that will not delaminate upon processing and subsequent use.

To produce stable blends it is necessary that at least two of the polymers have at least partial continuous networks which interlock with each other. Preferably, the block copolymer and at least one other polymer have partial continuous interlocking network structures. In an ideal situation all of the polymers would have complete continuous networks which interlock with each other. A partial continuous network means that a portion of the polymer has a continuous network phase structure while the other portion has a disperse phase structure. Preferably a major proportion (greater than 50% by weight) of the partial continuous network is continuous. As can be readily seen, a large variety of blend structures is possible since the structure of the polymer in the blend may be completely continuous, completely disperse, or partially continuous and partially disperse. Further yet, the disperse phase of one polymer may be dispersed in a second polymer and not in a third polymer. To illustrate some of the structures, the following lists the various combinations of polymer structures possible where all structures are complete as opposed to partial structures. Three polymers (A, B and C) are involved. The subscript "c" signifies a continuous structure while the subscript "d" signifies a disperse structure. Thus, the designation "$A_cB$" means that polymer A is continuous with polymer B, and the designation "$B_dC$" means that polymer B is disperse in polymer C, etc.

| | | |
|---|---|---|
| $A_cB$ | $A_cC$ | $B_cC$ |
| $A_dB$ | $A_dC$ | $B_dC$ |
| $A_cB$ | $A_cC$ | $B_dC$ |
| $B_dA$ | $A_cC$ | $B_cC$ |
| $B_cC$ | $A_cB$ | $A_cC$ |
| $C_dA$ | $A_cB$ | $A_cC$ |
| $C_dB$ | $A_cB$ | $A_cC$ |

Through practice of the present invention, it is possible to prepare polyblends that possess a much improved balance of properties as compared to the individual properties of the separate polymers. For example, the present invention permits the blending of a large amount of a polyamide with a smaller amount of a more expensive engineering thermoplastic, such as poly(butylene terephthalate), resulting in a polymer blend that retains much of the desirable properties of the more expensive engineering thermoplastic at a fraction of the cost.

It is particularly surprising that even just small amounts of the present block copolymer are sufficient to stabilize the structure of the polymer blend over very wide relative concentrations. For example, as little as four parts by weight of the block copolymer is sufficient to stabilize a blend of 5 to 90 parts by weight polyamide with 90 to 5 parts by weight of a dissimilar engineering thermoplastic.

In addition, it is also surprising that the instant block copolymers are useful in stabilizing polymers of such a wide variety and chemical makeup. As explained more fully hereinafter, the instant block copolymers have this ability to stabilize a wide variety of polymers over a wide range of concentrations since they are oxidatively stable, possess essentially an infinite viscosity at zero shear stress, and retain network or domain structure in the melt.

Another significant aspect of the present invention is that the ease of processing and forming the various polyblends is greatly improved by employing the instant block copolymers as stabilizers.

RELATIONSHIP TO OTHER APPLICATIONS

This application is related to patent application Ser. No. 776,174, filed Feb. 7, 1977, having a common assignee and common inventors.

DETAILED DESCRIPTION OF THE INVENTION

A. Block Copolymer

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadienepoly(alpha-methylstyrene) and
poly(alpha-methylstyrene)-polyisoprenepoly(alpha-methystyrene)

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alphamethylstyrene and ring-substituted styrenes, particularly ring-methylated styrenes. The preferred monoalkenyl arenes are styrene and alphamethylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight at the block copolymer, preferably between about 10 and 30% by weight.

While the average molecular weight of the individual blocks is not critical, at least within the above specified limits, it is important to select the type and total molecular weight of the block copolymer in order to ensure the compatibility necessary to get the interlocking network under the chosen blending conditions. As discussed more fully hereinafter, best results are obtained when the viscosity of the block copolymer and the engineering thermoplastic resins are substantially the same at the temperature used for blending and processing. In some instances, matching of the viscosity of the block copolymer portion and the resin portions are best achieved by using two or more block copolymers or resins. For example, a blend of two block copolymers having different molecular weights or a blend of a hydrogenated SBS and hydrogenated SIS polymers may be employed.

Matching of the viscosity of the block copolymer portion and the polyolefin and engineering thermoplastic resin portions may also be accomplished by adding supplemental blending components such as hydrocarbon oils and other resins. These supplementary components may be blended with the block copolymer portion, the polyamide portion, the engineering thermoplastic resin portion, or all portions, but it is preferred to add the additional components to the block copolymer portion. This pre-blended block copolymer composition is then intimately mixed with the polyamide and the engineering thermoplastic resin to form compositions according to the present invention.

The types of oils useful in the practice of this invention are those polymer extending oils ordinarily used in the processing of rubber and plastics, e.g. rubber compounding oils. Especially preferred are the types of oil that are compatible with the elastomeric segment of the block copolymer. While oils of higher aromatics content are satisfactory, those petroleum-based white oils having low volatility and less than 50% aromatics content as determined by the clay gel method of tentative ASTM method D 2007 are particularly preferred. The oils should additionally have low volatility, preferably having an initial boiling point above 500° F. The amount of oil employed varies from about 0 to about 100 phr (parts by weight per hundred parts by weight rubber, or block copolymer as in this case), preferably about 5 to about 30 phr.

The additional resins employed in matching viscosities are flow promoting resins such as alpha-methylstyrene resins, and end block plasticizing resins. Suitable end block plasticizing resins include coumarone-indene resins, vinyl toluene-alpha-methylstyrene copolymers, polyindene resins, and low molecular weight polystyrene resins. See U.S. Pat. No. 3,917,607. The amount of additional resin employed varies from about 0 to about 100 phr, preferably about 5 to about 25 phr.

B. Polyamides

By polyamide is meant a condensation product which contains recurring aromatic and/or aliphatic amide groups as integral parts of the main polymer chain, such products being known generically as "nylons". These may be obtained by polymerizing a monoaminomonocarboxylic acid or an internal lactam thereof having at least two carbon atoms between the amino and carboxylic acid groups; or by polymerizing substantially equimolar proportions of a diamine which contains at least two carbon atoms between the amino groups and a dicarboxylic acid; or by polymerizing a monoaminocarboxylic acid or an internal lactam thereof as defined above together with substantially equimolecular proportions of a diamine and a dicarboxylic acid. The dicarboxylic acid may be used in the form of a functional derivative thereof, for example an ester.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

As examples of the said monoaminomonocarboxylic acids or lactams thereof there may be mentioned those compounds containing from 2 to 16 carbon atoms between the amino and carboxylic acid groups, said carbon atoms forming a ring with the —CO·NH— group in the case of a lactam. As particular examples of aminocarboxylic acids and lactams there may be mentioned ε-aminocaproic acid, butyrolactam, pivalolactam, caprolactam, capryl-lactam, enantholactam, undecanolactam, dodecanolactam and 3- and 4-amino benzoic acids.

Examples of the said diamines are diamines of the general formula $H_2N(CH_2)_nNH_2$ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g. 2,2-dimethylpentamethylenediamine and 2,2,4- and 2,4,4-trimethylhexamethylenediamine are further examples. Other diamines which may be mentioned as examples are aromatic diamines, e.g. p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example diaminodicyclohexylmethane.

The said dicarboxylic acids may be aromatic, for example isophthalic and terephthalic acids. Preferred dicarboxylic acids are of the formula HOOC·Y·COOH wherein Y represents a divalent aliphatic radical containing at least 2 carbon atoms, and examples of such acids are sebacic acid, octadecanedioc acid, suberic acid, azelaic acid, undecanedioic acid, glutaric acid, pimelic acid, and especially adipic acid. Oxalic acid is also a preferred acid.

Specifically the following polyamides may be incorporated in the thermoplastic polymer blends of the invention:
polyhexamethylene adipamide (nylon 6:6)
polypyrrolidone (nylon 4)

polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)
polyhexamethylene azelaiamide (nylon 6:9)
polyhexamethylene sebacamide (nylon 6:10)
polyhexamethylene isophthalamide (nylon 6:iP)
polymetaxylylene adipamide (nylon MXD:6)
polyamide of hexamethylenediamine and n-dodecanedioic acid (nylon 6:12)
polyamide of dodecamethylenediamine and n-dodecanedioic acid (nylon 12:12)

Nylon copolymers may also be used, for example copolymers of the following:
hexamethylene adipamide/caprolactam (nylon 6:6/6)
hexamethylene adipamide/hexamethylene-isophthalamide (nylon 6:6/6ip)
hexamethylene adipamide/hexamethylene-terephthalamide (nylon 6:6/6T)
trimethylhexamethylene oxamide/hexamethylene oxamide (nylon trimethyl-6:2/6:2)
hexamethylene adipamide/hexamethylene-azelaiamide (nylon 6:6/6:9)
hexamethylene adipamide/hexamethylene-azelaiamide/caprolactam (nylon 6:6/6:9/6)

Also useful is nylon 6:3 produced by Dynamit Nobel. This polyamide is the product of the dimethyl ester of terephthalic acid and a mixture of isomeric trimethyl hexamethylenediamine. Another useful nylon is Du Pont's Zytel ® ST which is a nylon-based alloy.

Preferred nylons include nylon 6,6:6, 11, 12, 6:3 and 6:12.

The number average molecular weights of the polyamides used in the invention are generally above about 10,000.

C. Engineering Thermoplastic Resin

The term "dissimilar engineering thermoplastic" refers to engineering thermoplastics other than those encompassed by the polyamides of the instant invention.

For purposes of the specification and claims, the term "engineering thermoplastic resin" encompasses the various polymers found in the classes listed in Table A below and thereafter defined in the specification.

Table A

| | |
|---|---|
| 1. | Polyolefins |
| 2. | Thermoplastic polyesters |
| 3. | Poly(aryl ethers) and Poly(aryl sulfones) |
| 4. | Polycarbonates |
| 5. | Acetal resins |
| 6. | Thermoplastic polyurethanes |
| 7. | Halogenated thermoplastics |
| 8. | Nitrile barrier resins |

The label engineering thermoplastic resin has come to be applied to those polymers that possess a property balance comprising strength, stiffness, impact, and long term dimensional stability. Preferably these engineering thermoplastic resins have glass transition temperatures or apparent crystalline melting points (defined as that temperature at which the modulus, at low stress, shows a catastrophic drop) of over about 120° C, more preferably between about 150° C and about 350° C, and are capable of forming a continuous network structure through a thermally reversible crosslinking mechanism. Such thermally reversible crosslinking mechanisms include crystallites, polar aggregations, ionic aggregations, lamellae, or hydrogen bonding. In a specific embodiment, where the viscosity of the block copolymer or blended block copolymer composition at processing temperature Tp and a shear rate of 100 sec$^{-1}$ is $\eta$, the ratio of the viscosity of the engineering thermoplastic resins, or blend of engineering thermoplastic resin with viscosity modifiers to $\eta$ should be between about 0.2 and about 4.0, preferably about 0.8 and about 1.2. As used in the specification and claims, the viscosity of the block copolymer, polyamide and the thermoplastic engineering resin is the "melt viscosity" obtained by employing a piston driven capillary melt rheometer at constant shear rate and at some consistent temperature above melting, say 260° C. The upper limit (350° C) on apparent crystalline melting point or glass transition temperature is set so that the resin may be processed in low to medium shear rate equipment at commercial temperature levels of 350° C or less.

The engineering thermoplastic resin includes also blends of various engineering thermoplastic resins and blends with additional viscosity modifying resins.

These various classes of engineering thermoplastics are defined below.

1. Polyolefins

The polyolefins employed in the instant invention are crystalline or crystallizable poly(alpha-olefins) and their copolymers. The alpha-olefin or 1-olefin monomers employed in the instant invention have 2 to 5 carbon atoms. Examples of particular useful polyolefins include low density polyethylene, high density polyethylene, isotactic polypropylene, poly(1-butene), poly(4-methyl-1-pentene), and copolymers of 4-methyl-1-pentene with linear or branched alpha-olefins. A crystalline or crystallizable structure is important in order for the polymer to be capable of forming a continuous structure with the other polymers in the polymer blend of the instant invention. The number average molecular weight of the polyolefins is preferably above about 10,000, more preferably above about 50,000. In addition, it is preferred that the apparent crystalline melting point be above about 100° C, preferably between about 100° C and about 250° C, and more preferably between about 140° C and about 250° C. The preparation of these various polyolefins are well known. See generally "Olefin Polymers", Volume 14, Kirk-Othmer Encyclopedia of Chemical Technology, pages 217-335 (1967).

The high density polyethylene employed has an approximate cyrstallinity of over about 75% and a density in grams per cubic centimeter (g/cm$^3$) of between about 0.94 and 1.0 while the low density polyethylene employed has an approximate crystallinity of over about 35% and a density of between about 0.90 g/cm$^3$ and 0.94 g/cm$^3$. Most commercial polyethylenes have a number average molecular weight of about 50,000 to about 500,000.

The polypropylene employed is the so-called isotactic polypropylene as opposed to atactic polypropylene. This polypropylene is described in the above Kirk-Othmer reference and in U.S. Pat. No. 3,112,300. The number average molecular weight of the polypropylene employed is typically in excess of about 100,000. The polypropylene suitable for this invention may be prepared using methods of the prior art. Depending on the specific catalyst and polymerization conditions employed, the polymer produced may contain atactic as well as isotactic, syndiotactic or so-called stereo-block molecules. These may be separated, if desired, by selective solvent extraction to yield products of low atactic content that crystallize more completely. The preferred commercial polypropylenes are generally prepared using a solid, crystalline, hydrocarbon-insoluble catalyst made from a titanium trichloride composition and an aluminum alkyl compound, e.g., triethyl aluminum or diethyl aluminum chloride. If desired, the polypropylene employed may be a copolymer containing minor (1 to 20 percent by weight) amounts of ethylene or other alpha-olefin comonomers.

The poly(1-butene) preferably has an isotactic structure. The catalysts used in preparing the poly(1-butene) are typically organometallic compounds commonly referred to as Ziegler-Natta catalysts. A typical catalyst is the interacted product resulting from mixing equimolar quantities of titanium tetrachloride and triethylaluminum. The manufacturing process is normally carried out in an inert diluent such as hexane. Manufacturing operations, in all phases of polymer formation, are conducted in such a manner as to guarantee rigorous exclusion of water even in trace amounts.

One very suitable polyolefin is poly(4-methyl-1-pentene). Poly(4-methyl-1-pentene) typically has an apparent crystalline melting point of between about 240 and 250° C and a relative density of between about 0.80 and 0.85. Monomeric 4-methyl-1-pentene is commercially manufactured by the alkali-metal catalyzed dimerization of propylene. The homopolymerization of 4-methyl-1-pentene with Ziegler-Natta catalysts is described in the Kirk-Othmer Encyclopedia of Chemical Technology, Supplement volume, pages 789–792 (second edition, 1971). However, the isotactic homopolymer of 4-methyl-1-pentene has certain technical defects, such as brittleness and inadequate transparency. Therefore, commercially available poly(4-methyl-1-pentene) is actually a copolymer with minor proportions of other alpha-olefins, together with the addition of suitable oxidation and melt stabilizer systems. These copolymers are described in the Kirk-Othmer Encyclopedia of Chemical Technology, Supplement volume, pages 792–907 (second edition, 1971), and are available from Mitsui Chemical Company under the tradename TPX ® resin. Typical alpha-olefins are linear alpha-olefins having from 4 to 18 carbon atoms. Suitable resins are copolymers of 4-methyl-1-pentene with from about 0.5 to about 30% by weight of a linear alpha-olefin.

If desired, the polyolefin may be a mixture of various polyolefins. However, the much preferred polyolefin is isotactic polypropylene.

2. Thermoplastic Polyesters

The thermoplastic polyesters employed in the instant invention have a generally crystalline structure, a melting point over about 120° C, and are thermoplastic as opposed to thermosetting.

One particularly useful group of polyesters are those thermoplastic polyesters prepared by condensing a dicarboxylic acid or the lower alkyl ester, acid halide, or anhydride derivatives thereof with a glycol, according to methods well-known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxyphenoacetic acid, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p-dicarboxydiphenylpropane, p,p'-dicarboxydiphenyloctane, 3-alkyl-4-(β-carboxyethoxy)-benzoic acid, 2,6-naphthalene dicarboxylic acid, 2,7-naphthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds. Another suitable glycol is 1,4-cyclohexane dimethanol. Much preferred glycols are the straight chain alkylene glycols having 2 to 4 carbon atoms.

A preferred group of polyesters are poly(ethylene terephthalate), poly(propylene terephthalate), and poly(butylene terephthalate). A much preferred polyester is poly(butylene terephthalate). Poly(butylene terephthalate), a crystalline copolymer, may be formed by the polycondensation of 1,4-butanediol and dimethylterephthalate or terephthalic acid, and has the generalized formula:

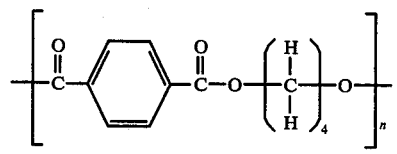

where $n$ varies from 70 to 140. The molecular weight of the poly(butylene terephthalate) typically varies from about 20,000 to about 25,000. A suitable process for manufacturing the polymer is disclosed in British Pat. No. 1,305,130.

Commercially available poly(butylene terephthalate) is available from General Electric under the tradename VALOX ® thermoplastic polyester. Other commercial polymers include CELANEX ® from Celenese, TENITE ® from Eastman Kodak, and VITUF ® from Goodyear Chemical.

Other useful polyesters include the cellulosics. The thermoplastic cellulosic esters employed herein are widely used as molding, coating and film-forming materials and are well known. These materials include the solid thermoplastic forms of cellulose nitrate, cellulose acetate (e.g. cellulose diacetate, cellulose triacetate), cellulose butyrate, cellulose acetate butyrate, cellulose propionate, cellulose tridecanoate, carboxymethyl cellulose, ethyl cellulose, hydroxyethyl cellulose and acetylated hydroxyethyl cellulose as described on pages 25–28 of Modern Plastics Encyclopedia, 1971-72, and references listed therein.

Another useful polyester is polypivalolactone. Polypivalolactone is a linear polymer having recurring ester structural units mainly of the formula:

i.e., units derived from pivalolactone. Preferably the polyester is a pivalolactone homopolymer. Also included, however, are the copolymers of pivalolactone with not more than 50 mole percent, preferably not more than 10 mole percent of other beta-propiolactones, such as beta-propiolactone, alpha, alpha-diethylbeta-propiolactone and alpha-methyl-alpha-ethyl-beta-propiolactone. The term "beta-propiolactones" refers to beta-propiolactone (2-oxetanone) and to derivatives thereof which carry no substituents at the beta-carbon atom of the lactone ring. Preferred beta-propiolactones are those containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are:

alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
alpha, alpha-bis(chloromethyl)-beta-propiolactone, and
alpha, alpha-dimethl-beta-propiolactone (pivalolactone).

See generally U.S. Pat. No. 3,259,607; U.S. Pat. No. 3,299,171; and U.S. Pat. No. 3,579,489. These polypivalolactones have a molecular weight in excess of 20,000 and a melting point in excess of 120° C.

Another useful polyester is polycaprolactone. Typical poly(ε-caprolactones) are substantially linear polymers in which the repeating unit is

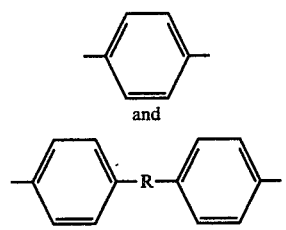

These polymers have similar properties to the polypivalolactones and may be prepared by a similar polymerization mechanism. See generally U.S. Pat. No. 3,259,607.

3. Poly(aryl ethers) and Poly(aryl sulfones)

Various polyaryl polyethers are also useful as engineering thermoplastic resins. The poly(aryl polyethers) envisioned in the present invention include the linear thermoplastic polymers composed of recurring units having the formula $+O-G-O-G'+$  I wherein G is the residuum of a dihydric phenol selected from the group consisting of

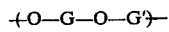

and

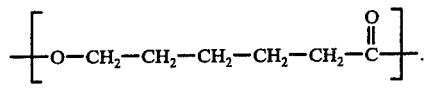

II

III wherein R represents a bond between aromatic carbon atoms, —O—, —S—, —S—S—, or divalent hydrocarbon radical having from 1 to 18 carbon atoms inclusive, and G' is the residuum of a dibromo or diiodobenzenoid compound selected from the group consisting of

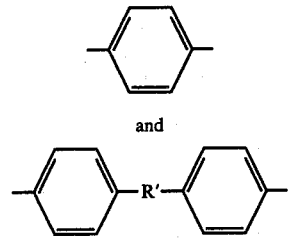

IV and

V wherein R' represents a bond between aromatic carbon atoms, —O—, —S—, —S—S—, or a divalent hydrocarbon radical having from 1 to 18 carbon atoms inclusive, with the provisions that when R is —O—, R' is other than —O—; when R' is —O—, R is other than —O—; when G is II, G' is V, and when G' is IV, G is III. Polyarylene polyethers of this type exhibit excellent physical properties as well as excellent thermal oxidative and chemical stability. These poly(aryl polyethers) can be produced by the method disclosed in U.S. Pat. No. 3,332,909. Commercial poly(aryl polyethers) can be obtained from Uniroyal Chemical Division under the tradename ARYLON T ® Polyarylethers, having a melt temperature of between about 280° C and 310° C.

Another group of useful engineering thermoplastic resins include aromatic poly(sulfones) comprising repeating units of the formula —Ar—SO$_2$— in which Ar is a bivalent aromatic radical and may vary from unit to unit in the polymer chain (so as to form copolymers of various kinds). Thermoplastic poly(sulfones) generally have at least some units of the structure

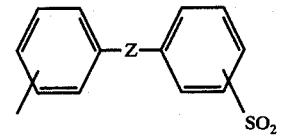

in which Z is oxygen or sulphur or the residue of an aromatic diol such as a 4,4' bisphenol. One example of such a poly(sulfone) has repeating units of the formula

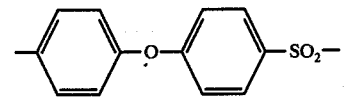

another has repeating units of the formula

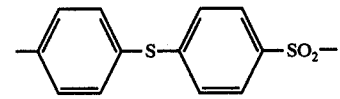

and others have repeating units of the formula

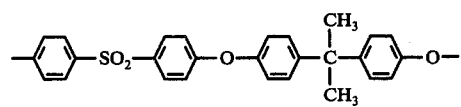

or copolymerized units in various proportions of the formula

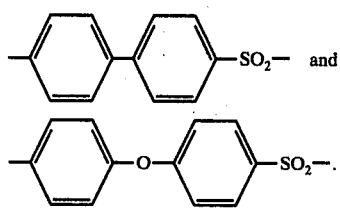

The thermoplastic poly(sulfones) may also have repeating units having the formula

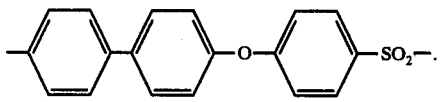

These aromatic poly(sulfones) and their method of preparation are disclosed in the various patent references cited in the first column of U.S. Pat. No. 3,729,527.

Poly(ether sulfones) having repeating units of the following structure

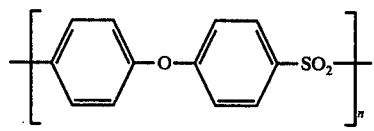

can be prepared by the method disclosed in U.S. Pat. No. 3,634,355; and are available from ICI United States Inc. as grades 200P and 300P. ICI grade 200P has a glass transition temperature of about 230° C.

Poly(ether sulfones) having repeating units of the following structure

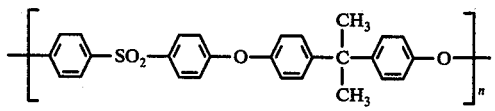

are available from Union Carbide as UDEL ® poly(sulfone) resin.

4. Polycarbonates

The polycarbonates utilized in the preparation of the blends of this invention are of the general formulae

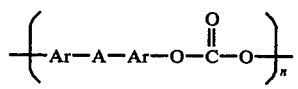

and

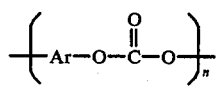

wherein Ar is selected from the group consisting of phenylene and alkyl, alkoxyl, halogen and nitro-substituted phenylene; A is selected from the group consisting of carbon-to-carbon bonds, alkylidene, cycloalkylidene, alkylene, cycloalkylene, azo, imino, sulfur, oxygen, sulfoxide and sulfone, and $n$ is at least two.

The preparation of the polycarbonates is well known and the details thereof need not be delineated herein. There are a variety of preparative procedures set forth in Chemistry and Physics of Polycarbonates by Herman Schnell, Interscience Division of John Wiley & Co., New York (1964), first edition, as well as in British Pat. No. 772,627 and U.S. Pat. No. 3,028,365. In general, a preferred reaction is carried out by dissolving the dihydroxy component in a base such as pyridine and bubbling phosgene into the stirred solution at the desired rate. Tertiary amines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar ratios can be varied dependent upon the reaction conditions.

The preferred polycarbonate utilized in this invention is obtained when Ar is p-phenylene and A is isopropylidene. This polycarbonate is prepared by reacting para, para'-isopropylidenediphenol with phosgene and is sold by General Electric Company under the trademark LEXAN ® and by Mobay under the trademark MERLON ®. This commercial polycarbonate typically has a molecular weight of around 18,000, and a melt temperature of over 230° C. Other polycarbonates may be prepared by reacting other dihydroxy compounds, or mixtures of dihydroxy compounds, with phosgene. The dihydroxy compounds may include aliphatic dihydroxy compounds although for best high temperature properties aromatic rings are essential. The dihydroxy compounds may include within the structure diurethane linkages. Also, part of the structure may be replaced by siloxane linkage. These and other variations of polycarbonate structure are described in the Schnell reference cited above. The same reference presents a long list of monomers (particularly dihydroxy compounds) that may be used in polycarbonate synthesis.

5. Acetal Resin

The acetal resins employed in the blends of the instant invention include the high molecular weight polyacetal homopolymers made by polymerizing formaldehyde, see MacDonald U.S. Pat. No. 2,768,944 (Du Pont) or by polymerizing trioxane, see Bartz U.S. Pat. Nos. 2,947,727 and 2,947,728. The literature on formaldehyde polymerization, synthesis steps and properties of useful acetal resins is summarized in the Journal of Applied Polymer Science, 1, 158–191 (1959). These polyacetal homopolymers are commercially available from Du Pont under the tradename DELRIN ®. A related polyether-type resin is available from Hercules under the tradename PENTON ® and has the structure:

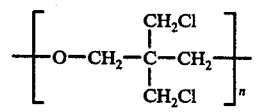

The acetal resin prepared from formaldehyde has a high molecular weight and a structure typified by the following:

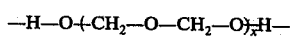

where terminal groups are derived from controlled amounts of water and the $x$ denotes a large (typically 1500) number of formaldehyde units linked in head-to-tail fashion. To increase thermal and chemical resistance, terminal groups are typically converted to esters or ethers.

Also included in the term polyacetal resins are the polyacetal copolymers, such as those listed in British Pat. No. 807,589 (Du Pont). These copolymers include block copolymers of formaldehyde with monomers or prepolymers of other materials capable of providing active hydrogens, such as alkylene glycols, polythiols, vinyl acetate - acrylic acid copolymers, or reduced butadiene/acrylonitrile polymers.

Celanese has commercially available a copolymer of formaldehyde and ethylene oxide under the tradename CELCON ® that is useful in the blends of the present invention. These copolymers typically have a structure comprising recurring units having the formula

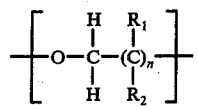

wherein each $R_1$ and $R_2$ is selected from the group consisting of hydrogen, lower alkyl and lower halogen substituted alkyl radicals and wherein $n$ is an integer from zero to three and wherein $n$ is zero in from 85% to 99.9% of the recurring units. See U.S. Pat. No. 3,027,352; U.S. Pat. No. 3,072,609; and British Pat. No. 911,960.

Formaldehyde and trioxane can be copolymerized with an unlimited number of other aldehydes, cyclic ethers, vinyl compounds, ketenes, cyclic carbonates, epoxides, isocyanate, ethers, and other compounds. These compounds include ethylene oxide, 1,3-dioxolane, 1,3-dioxane, 1,3-dioxepene, epichlorohydrin, propylene oxide, isobutylene oxide, and styrene oxide.

6. Thermoplastic Polyurethanes

Polyurethanes, otherwise known as isocyanate resins, also can be employed in this invention as long as they are thermoplastic as opposed to thermosetting. Some of these thermoplastic condensation polymers are described on pages 106–108 of Modern Plastics Encyclopedia, 1971–72. For example, polyurethanes formed from toluene diisocyanate (TDI) or diphenyl methane 4,4-diisocyanate (MDI) and a wide range of polyols, such as, polyoxyethylene glycol, polyoxypropylene glycol, hydroxy-terminated polyesters, polyoxyethylene-oxypropylene glycols are suitable. The thermoplastic, normally solid polyrethanes described in Saunders & Frisch, "Polyurethanes: Chemistry and Technology," Interscience Publishers, New York, Part I, Chemistry," published in 1963 and Part II, "Technology," published in 1964 can be used.

These thermoplastic polyurethanes are avaible from K. J. Quinn Co. under the tradename Q-THANE ® and from Upjohn Co. under the tradename PELLE-THANE ® CPR.

7. Halogenated Thermoplastics

Another group of useful engineering thermoplastics include those halogenated thermoplastics having an essentially crystalline structure and a melt point in excess of 120° C. These halogenated thermoplastics include polytetrafluoroethylene, polychlorotrifluoroethylene, polybromotrifluoroethylene, poly(vinylidene fluoride) homopolymer and copolymer, and poly(vinylidene chloride) homopolymer and copolymer.

Polytetrafluoroethylene (PTFE) is the name given to fully fluorinated polymers of the basic chemical formula $\pm(CF_2-CF_2)_n$ which contain 76% by weight fluorine. These polymers are highly crystalline and have a crystalline melting point of over 300° C. Commercial PTFE is available from Du Pont under the tradename TEFLON ® and from Imperial Chemical Industries under the tradename FLUON ®. Polychlorotrifluoroethylene (PCTFE) and polybromotrifluoroethylene (PBTFE) are also available in high molecular weights and can be employed in the instant invention. The methods for preparing PTFE, PCTFE, and PBTFE along with the polymer properties are discussed in the Kirk-Othmer Encyclopedia of Science and Technology, Volume 9, pages 805–847 (1966).

Especially preferred halogenated polymers are homopolymers and copolymers of vinylidene fluoride. Poly(vinylidene fluoride) homopolymers are the partially fluorinated polymers of the chemical formula $\pm(CH_2-CF_2)_n$. These polymers are tough linear polymers with a crystalline melting point at 170° C. Commercial homopolymer is available from Pennwalt Chemicals Corporation under the tradename KYNAR ®. See Kirk-Othmer Encyclopedia of Science and Technology, Volume 9, pages 840–847 (1966). The term "poly(vinylidene fluoride)" as used herein refers not only to the normally solid homopolymers of vinylidene fluoride, but also to the normally solid copolymers of vinylidene fluoride containing at least 50 mole percent of polymerized vinylidene fluoride units, preferably at least about 70 mole percent vinylidene fluoride and more preferably at least about 90%. Suitable comonomers are halogenated olefins containing up to 4 carbon atoms, for example, sym. dichlorodifluoroethylene, vinyl fluoride, vinyl chloride, vinylidene chloride, perfluoropropene perfluorobutadiene, chlorotrifluoroethylene, trichloroethylene, tetrafluoroethylene and the like. Methods of synthesizing vinylidene fluoride polymers are well known and many of the polymers are available commercially. See generally U.S. Pat. No. 3,510,429.

Another useful group of halogenated thermoplastics include poly(vinylidene chloride) homopolymers and copolymers. Crystalline vinylidene chloride copolymers are especially preferred. The normally crystalline vinylidene chloride copolymers that are useful in the present invention are those containing at least about 70 percent by weight of vinylidene chloride together with 30 percent or less of a copolymerizable monoethylenic monomer. Exemplary of such monomers are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl ethers and others, butadiene and chloropropene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known. Particularly useful for the purposes of the present invention, are copolymers of from about 70 to about 95 percent by weight vinylidene chloride with the balance being vinyl chloride. Such copolymers may contain conventional amounts and types of plasticizers, stabilizers, nucleators and extrusion aids. Further, blends of two or more of such normally crystalline vinylidene chloride polymers may be used as well as blends comprising such normally crystalline polymers in combination with other polymeric modifiers e.g. the copolymers of ethylene-vinyl acetate, styrene-maleic anhydride, styrene-acrylonitrile and polyethylene. See U.S. Pat. No. 3,983,080; U.S. Pat. No. 3,291,769; and U.S. Pat. No. 3,642,743.

8. Nitrile Barrier Resins

The nitrile barrier resins of the instant invention are those thermoplastic materials having an alpha, beta-olefinically unsaturated mononitrile content of 50% by weight or greater. These nitrile barrier resins may be copolymers, grafts of copolymers onto a rubbery substrate, or blends of homopolymers and/or copolymers.

The alpha, beta-olefinically unsaturated mononitriles encompassed herein have the structure

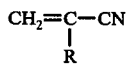

where R is hydrogen, a lower alkyl group having from 1 to 4 carbon atoms, or a halogen. Such compounds include acrylonitrile, alphabromoacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

These nitrile barrier resins may be divided into several classes on the basis of complexity. The simplest molecular structure is a random copolymer, predominantly acrylonitrile or methacrylonitrile. The most common example is a styrene-acrylonitrile copolymer. Block copolymers of acrylonitrile, in which long segments of polyacrylonitrile alternate with segments of polystyrene, or of polymethyl methacrylate, are also known.

Simultaneous polymerization of more than two comonomers produces an interpolymer, or in the case of three components, a terpolymer. A large number of comonomers are known. These include lower alpha olefins of from 2 to 8 carbon atoms, e.g., ethylene, propylene, isobutylene, butene-1, pentene-1, and their halogen and aliphatic substituted derivatives as represented by vinyl chloride, vinylidene chloride, etc.; monovinylidene aromatic hydrocarbon monomers of the general formula:

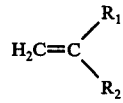

wherein R$_1$ is hydrogen, chlorine or methyl and R$_2$ is an aromatic radical of 6 to 10 carbon atoms which may also contain substituents such as halogen and alkyl groups attached to the aromatic nucleus, e.g., styrene, alpha methyl styrene, vinyl toluene, alpha chlorostyrene, ortho chlorostyrene, para chlorostyrene, meta chlorostyrene, ortho methyl styrene, para methyl styrene, ethyl styrene, isopropyl styrene, dichloro styrene, vinyl naphthalene, etc. Especially preferred comonomers are isobutylene and styrene.

Another group of comonomers are vinyl ester monomers of the general formula:

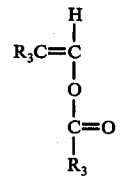

wherein R$_3$ is selected from the group conprising hydrogen, alkyl groups of from 1 to 10 carbon atoms, aryl groups of from 6 to 10 carbon atoms including the carbon atoms in ring substituted alkyl substituents; e.g. vinyl formate, vinyl acetate, vinyl propionate, vinyl benzoate and the like.

Similar to the foregoing and also useful are the vinyl ether monomers of the general formula:

wherein R$_4$ is an alkyl group of from 1 to 8 carbon atoms, an aryl group of from 6 to 10 carbons, or a monovalent aliphatic radical of from 2 to 10 carbon atoms, which aliphatic radical may be hydrocarbon or oxygen-containing, e.g., an aliphatic radical with ether linkages, and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl isobutyl ether, vinyl cyclohexyl ether, p-butyl cyclohexyl ether, vinyl ether or p-chlorophenyl glycol, etc.

Other comonomers are those comonomers which contain a mono- or di-nitrile function. Examples of these include methylene glutaronitrile, (2,4-dicyanobutene-1), vinylidene cyanide, crotonitrile, fumarodinitrile, maleodinitrile.

Other comonomers include the esters of olefinically unsaturated carboxylic acids, preferably the lower alkyl esters of alpha, beta-olefinically unsaturated carboxylic acids and more preferred the esters having the structure

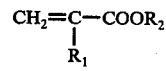

wherein R$_1$ is hydrogen, an alkyl group having from 1 to 4 carbon atoms, or a halogen and R$_2$ is an alkyl group having from 1 to 2 carbon atoms. Compounds of this type include methyl acrylate, ethyl acrylate, methyl methacrylate, ethyl methacrylate, methyl alpha-chloro acrylate, and the like. Most preferred are methyl acrylate, ethyl acrylate, methyl methacrylate and ethyl methacrylate.

Another class of nitrile barrier resins are the graft copolymers which have a polymeric backbone on which branches of another polymeric chain are attached or grafted. Generally the backbone is preformed in a separate reaction. Polyacrylonitrile may be grafted with chains of styrene, vinyl acetate, or methyl methacrylate, for example. The backbone may consist of one, two, three, or more components, and the grafted branches may be composed of one, two, three or more comonomers.

The most promising products are the nitrile copolymers that are partially grafted on a preformed rubbery substrate. This substrate contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen the polymer. This rubbery component may be incorporated into the nitrile containing polymer by any of the methods which are well known to those skilled in the art, e.g., direct polymerization of monomers, grafting the acrylonitrile monomer mixture onto the rubber backbone, physical admixtures of the rubbery component, etc. Especially preferred are polymer blends derived by mixing a graft copolymer of the acrylonitrile and comonomer on the rubber backbone with another copolymer of acrylonitrile and the same comonomer. The acrylonitrile-based thermoplastics are frequently polymer blends of a grafted polymer and an ungrafted homopolymer.

The methods of forming these various nitrile barrier resins and examples of these resins can be found in the following patents:

| | |
|---|---|
| U.S. Pat. Nos. | 3,325,458 |
| | 3,336,276 |
| | 3,426,102 |
| | 3,451,538 |
| | 3,540,577 |
| | 3,580,974 |
| | 3,586,737 |
| | 3,634,547 |
| | 3,652,731 |
| | 3,671,607 |
| British Patents | 1,279,745 |
| | 1,286,380 |
| | 1,327,095 |

Commercial examples of nitrile barrier resins include BAREX® 210 resin by Standard Oil of Ohio, an acrylonitrile-based high nitrile resin containing over 65% nitrile, and Monsanto's LOPAC® resin containing over 70% nitrile, three-fourths of it derived from methacrylonitrile.

D. Viscosity Modifiers

In order to better match the viscosity characteristics of the thermoplastic engineering resin, the polyamide and the block copolymer, it is sometimes useful to first blend the thermoplastic engineering resin with a viscosity modifier before blending the resulting mixture with the polyamide and block copolymer. Suitable viscosity modifiers should have a relatively high viscosity, a melt temperature of over about 230° C, and possess a viscosity that is not very sensitive to changes in temperature. Examples of suitable viscosity modifiers include poly(2,6-dimethyl-1,4-phenylene)oxide and blends of poly(2,6-dimethyl-1,4-phenylene)oxide with polystyrene.

The poly(phenylene oxides) included as possible viscosity modifiers may be presented by the following formula

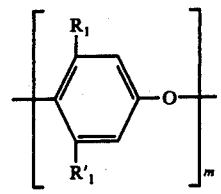

wherein $R_1$ is a monovalent substituent selected from the group consisting of hydrogen, hydrocarbon radicals free of a tertiary alphacarbon atom, halohydrocarbon radicals having at least two carbon atoms between the halogen atom and phenol nucleus and being free of a tertiary alpha-carbon arom, hydrocarbonoxy radicals free of aliphatic, tertiary alpha-carbon atoms, and halohydrocarbonoxy radicals having at least two carbon atoms between the halogen atom and phenol nucleus and being free of an aliphatic, tertiary alpha-carbon atom; $R'_1$ is the same as $R_1$ and may additionally be a halogen; $m$ is an integer equal to at least 50, e.g. from 50 to 800 and preferably 150 to 300. Included among these preferred polymers are polymers having a molecular weight in the range of between 6,000 and 100,000 preferably about 40,000. Preferably, the poly(phenylene oxide) is poly(2,6-dimethyl-1,4-phenylene)oxide. These poly(phenylene oxides) are described, for example, in U.S. Pat. No. 3,306,874; U.S. Pat. No. 3,306,875; and U.S. Pat. No. 3,639,508.

Commercially, the poly(phenylene oxide) is available as a blend with styrene resin. See U.S. Pat. No. 3,383,435 and U.S. Pat. No. 3,663,654. These blends typically comprise between about 25 and 50% by weight polystyrene units, and are available from General Electric Company under the tradename NORYL® thermoplastic resin. The preferred molecular weight when employing a poly(phenylene oxide)/polystyrene blend is between about 10,000 and about 50,000, preferably around 30,000.

The amount of viscosity modifier employed depends primarily upon the difference between the viscosities of the block copolymer and the engineering thermoplastic resin at the processing temperature Tp. Typical amounts range from about 0 to about 100 parts by weight viscosity modifier per 100 parts by weight engineering thermoplastic resin, preferably from about 10 to about 50 parts by weight per 100 parts engineering thermoplastic resin.

E. Method of Forming Interlocking Networks

The various engineering thermoplastic resins, including the herein described polyamides, are normally immiscible, that is, typical blends produce grossly heterogeneous mixtures with no useful properties. By employing the present block copolymers to stabilize the various polymer blends, non-delaminating compositions are formed. However, it is an essential aspect of the present invention that the various polymers can be blended in such a way as to form co-continuous interlocking networks; i.e., where a continuous phase of one polymer would be thought of as filling the voids of a continuous phase of the second polymer. The interlocking structure of the various polymers does not show gross phase separation such as would lead to delamination. Further, the blend is not so intimately mixed that there is molecular mixing or miscibility, nor one in which the separate phases will lead to delamination.

Without wishing to be bound to any particular theory, it is considered that there are two general requirements for the formation of an interlocking network. First, there must be a primary phase network stable to the shearing field. This requirement is fulfilled by employing the block copolymers of the instant invention having the capability of self-crosslinking (network formation) and furthermore having sufficiently high molecular weight to retain its network (domain) structure in processing. Second, the other polymers employed must be capable of some kind of chemical or physical crosslinks or other intermolecular association to maintain a continuous phase in the blend. The polymer must possess sufficient fluidity to interlock with the primary network in the blending process. This second requirement is met by the instant thermoplastic engineering resins, the blends of these resins with the instant viscosity modifiers, and the instant polyolefins.

There are at least two methods (other than the absence of delamination) by which the presence of an interlocking network can be shown. In one method, an interlocking network is shown when molded or extruded objects made from the blends of this invention are placed in a refluxing solvent that quantitatively dissolves away the block copolymer and other soluble components, and the remaining polymer structure (comprising the thermoplastic engineering resin and polyamide) still has the shape and continuity of the molded or extruded object and is intact structurally without any crumbling or delamination, and the refluxing solvent carries no insoluble particulate matter. If these criteria are fulfilled, then both the unextracted and extracted phases are interlocking and continuous. The unextracted phase must be continuous because it is geometrically and mechanically intact. The extracted phase must have been continuous before extraction, since quantitative extraction of a dispersed phase from an insoluble matrix is highly unlikely. Finally, interlocking networks must be present in order to have simultaneous continuous phases. Also, confirmation of the continuity of the unextracted phase may be made by microscopic examination. In the present blends containing more than two components, the interlocking nature and continuity of each separate phase may be established by selective extraction. For example, in a blend containing block copolymer, polypropylene, and nylon 6, the block copolymers may be first extracted by refluxing toluene, leaving the polypropylene and nylon phases. Then the nylon may be extracted by hydrochloric acid leaving the polypropylene phase. Alternatively, the nylon may be extracted first and then the block copolymer. See generally Japanese Pat. No. 1,017,989. Phase continuity and the interconnecting of holes may be microscopically examined after each extraction.

In the second method, a mechanical property such as tensile modulus is measured and compared with that expected from an assumed system where each continuous isotropically distributed phase contributes a fraction of the mechanical response, proportional to its compositional fraction by volume. Correspondence of the two values indicates presence of the interlocking network, whereas, if the interlocking network is not present, the measured value is different than that of the predicted value.

An important aspect of the present invention is that the relative proportions of the various polymers in the blend can be varied over a wide range. The relative proportions of the polymers are presented below in parts by weight (the total blend comprising 100 parts):

|  | Preferred | Most Preferred |
| --- | --- | --- |
| Dissimilar Engineering Thermoplastic | 5 to 48 | 10 to 35 |
| Block Copolymer | 4 to 40 | 8 to 20 |

The polyamide is present in an amount greater than the amount of the dissimilar engineering thermoplastic, i.e., the weight ratio of polyamide to dissimilar engineering thermoplastic is greater than 1:1. Accordingly, the amount of polyamide may vary from about 30 parts by weight to about 91 parts by weight, preferably about 48 to about 70 parts by weight. Note that the minimum amount of block copolymer necessary to achieve these blends may vary with the particular engineering thermoplastic.

The blending of the dissimilar engineering thermoplastic resin, polyamide and the block copolymer may be done in any manner that produces a blend which will not delaminate on processing, i.e., in any manner that produces the interlocking network. For example, the resin, polyamide and block copolymer may be dissolved in a solvent common for all and coagulated by admixing in a solvent in which none of the polymers are soluble. But more preferably, a particularly useful procedure is to intimately mix the polymers in the form of granules and/or powder in a high shear mixer. "Intimately mixing" means to mix the polymers with sufficient mechanical shear and thermal energy to ensure that interlocking of the various networks is achieved. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, as explained more fully hereinafter, the processing temperature may also be chosen so as to permit the isoviscous mixing of the polymers. Typically, the mixing or processing temperature is between about 150° C and about 400° C. For blends containing poly(butylene terephthalate) Tp is preferably between about 230° C and about 300° C.

Another parameter that is important in melt blending to ensure the formation of interlocking networks is matching the viscosities of the block copolymer, polyamide and the dissimilar engineering thermoplastic resin (isoviscous mixing) at the temperature and shear stress of the mixing process. The better the interdispersion of the engineering resin and polyamide in the block copolymer network, the better the chance for formation of co-continuous interlocking networks on subsequent cooling. Therefore, it has been found that when the block copolymer has a viscosity $\eta$ poise at temperature Tp and shear rate of 100 sec$^{-1}$, it is much preferred that the viscosity of the engineering thermoplastic resin, blend containing such resin, and polyamide have a viscosity at temperature Tp and a shear rate of 100 sec$^{-1}$ such that the ratio of the viscosity of the block copolymer over the viscosity of the engineering thermoplastic and/or polyamide be between about 0.2 and about 4.0, preferably between about 0.8 and about 1.2. Accordingly, as used herein, isoviscous mixing means that the viscosity of the block copolymer divided by the viscosity of the other polymer or polymer blend at the temperature Tp is between about 0.2 and about 4.0. It should also be noted that within an extruder, there is a wide distribution of shear rates. Therefore, isoviscous mixing can occur even though the viscosity curves of two polymers differ at some of the shear rates.

In some cases, the order of mixing the polymers is critical. Accordingly, one may choose to mix the block copolymer with the polyamide or other polymer first, and then mix the resulting blend with the dissimilar engineering thermoplastic, or one may simply mix all the polymers at the same time. There are many variants on the order of mixing that can be employed, resulting in the multicomponent blends of the instant invention. It is also clear that the order of mixing can be employed in order to better match the relative viscosities of the various polymers.

The block copolymer or block copolymer blend may be selected to essentially match the viscosity of the engineering resin and/or polyolefin. Optionally, the block copolymer may be mixed with a rubber compounding oil or supplemental resin as described hereinbefore to change the viscosity characteristics of the block copolymer.

The particular physical properties of the instant block copolymers are important in forming co-continuous interlocking networks. Specifically, the most preferred block copolymers of the instant invention when unblended do not melt in the ordinary sense with increasing temperature, since the viscosity of these polymers is highly non-Newtonian and tends to increase without limit as zero shear stress is approached. Further, the viscosity of these block copolymers is also relatively insensitive to temperature. This rheological behavior and inherent thermal stability of the block copolymer enhances its ability to retain its network (domain) structure in the melt so that when the various blends are made, interlocking and continuous networks are formed.

The viscosity behavior of the instant thermoplastic engineering resins, and polyamides on the other hand, typically is more sensitive to temperature than that of the instant block copolymers. Accordingly, it is often possible to select a processing temperature Tp at which the viscosities of the block copolymer and dissimilar engineering resin and/or polyamide fall within the required range necessary to form interlocking networks. Optionally, a viscosity modifier, as hereinabove described, may first be blended with the engineering thermoplastic resin or polyamide to achieve the necessary viscosity matching.

F. Uses and Additional Components

The polymer blends of the instant invention may be compounded further with other polymers, oils, fillers, reinforcements, antioxidants, stabilizers, fire retardants, antiblocking agents and other rubber and plastic compounding ingredients without departing from the scope of this invention.

Examples of various fillers that can be employed are in the 1971–1972 Modern Plastics Encyclopedia, pages 240–247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight glass fibers, based on the total weight of the resulting reinforced blend. It is particularly desired that coupling agents, such as various silanes, be employed in the preparation of the reinforced blends.

The polymer blends of the instant invention can be employed in any use typically performed by engineering thermoplastics, such as metal replacements and those areas where high performance is necessary.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

In the Illustrative Embodiments and Comparative Example, various polymer blends were prepared by mixing the polymers in a 1¼ inch Sterling Extruder having a Kenics Nozzle. The extruder has a 24:1 L/D ratio and a 3.8:1 compression ratio screw.

The various materials employed in the blends are listed below:

1. Block copolymer — a selectively hydrogenated block copolymer according to the present invention having a structure S-EB-S and block molecular weights of about 7,500-38,000-7,500.
2. Oil - Tufflo 6056 rubber extending oil.
3. Nylon 6 - PLASKON® 8207 polyamide from Allied Chemical.
4. Nylon 6-12 - ZYTEL® 158 polyamide from Du Pont.
5. Polypropylene - Shell's 5520 polypropylene, which is an essentially isotactic polypropylene having a melt flow index of about 5 (230° C/2.16kg).
6. Poly(butylene terephthalate) - General Electric's VALOX® 310 resin (PBT).
7. Polycarbonate - MERLON® M-40 polycarbonate from Mobay.
8. Poly(ether sulfone) - ICI's 200 P.
9. Polyurethane - PELLETHANE® CPR from Upjohn.
10. Polyacetal - DELRIN® 500 from Du Pont.
11. Poly(acrylonitrile-co-styrene) - BAREX® 210 from Standard Oil of Ohio.
12. Fluoropolymer - TEFZEL® 200 poly(vinylidene fluoride) copolymer from Du Pont.

In all blends containing an oil component, the block copolymer and oil were premixed prior to the addition of the other polymers.

Illustrative Embodiment I

In Illustrative Embodiment I, various polymer blends were prepared according to the present invention. In each case, the polymer blend was easily mixed, and the extrudate was homogeneous in appearance. Further, in each case, the resulting polyblend had the desired continuous, interlocking networks as established by the criteria hereinabove described.

The compositions, conditions and test results are presented below in Table 1. The compositions are listed in percent by weight.

TABLE 1

| Blend No. | 14 | 15 | 16 | 17 | 39 | 42 | 43 | 52 | 61 | 75 | 76 | 81 | 82 | 97 | 98 | 99 | 100 | 101 | 102 | 103 | 104 | 105 | 106 | 112 | 113 | 177 | 178 |
|---|---|---|---|---|---|---|---|---|---|---|---|---|---|---|---|---|---|---|---|---|---|---|---|---|---|---|---|
| Block Copolymer | 4.2 | 8.3 | 12.5 | 25.0 | 4.3 | 13.0 | 25.5 | 5.8 | 11.2 | 13.0 | 26.0 | 15.0 | 30.0 | 15.0 | 30.0 | 15.0 | 30.0 | 15.0 | 30.0 | 15.0 | 30.0 | 15.0 | 30.0 | 12.5 | 25.0 | 15.0 | 30.0 |
| Oil | 0.8 | 1.7 | 2.5 | 5.0 | 0.7 | 2.0 | 4.5 | 1.2 | 2.8 | 2.0 | 4.0 | | | | | | | | | | | | | 2.5 | 5.0 | | |
| Nylon 6 | 47.5 | 45.0 | 42.5 | 35.0 | 47.5 | 42.5 | 35.0 | 25.2 | | 21.3 | 17.5 | 21.3 | 17.5 | 63.7 | 52.5 | 63.7 | 52.5 | 63.7 | 52.5 | 63.7 | 52.5 | 63.7 | 52.5 | 63.7 | 52.5 | 21.3 | 17.5 |
| Nylon 6-12 | | | | | | | | | 43.0 | | | | | | | | | | | | | | | | | | |
| Polypropylene | 47.5 | 45.0 | 42.5 | 35.0 | | | | 67.8 | 43.0 | | | | | | | | | | | | | | | | | | |
| Poly(butylene terephthalate) | | | | | 47.5 | 42.5 | 35.0 | | | 63.7 | 52.5 | 63.7 | 52.5 | | | | | | | | | | | | | | |
| Polycarbonate | | | | | | | | | | | | | | 21.3 | 17.5 | | | | | | | | | | | | |
| Poly(ether sulfone) | | | | | | | | | | | | | | | | 21.3 | 17.5 | | | | | | | | | | |
| Polyurethane | | | | | | | | | | | | | | | | | | 21.3 | 17.5 | | | | | | | | |
| Polyacetal | | | | | | | | | | | | | | | | | | | | 21.3 | 17.5 | | | | | | |
| Poly(acrylonitrile-co-styrene) | | | | | | | | | | | | | | | | | | | | | | 21.3 | 17.5 | | | | |
| Fluoropolymer | | | | | | | | | | | | | | | | | | | | | | | | 21.3 | 17.5 | 63.7 | 52.5 |
| Mixing (Melt) Temperature (° C) | 230 | 230 | 230 | 228 | 262 | — | — | — | — | 250 | 250 | 260 | 268 | 262 | 262 | 284 | 290 | 280 | 290 | 233 | 238 | 248 | 246 | 234 | 236 | 245 | 234 |

Illustrative Embodiment II

In Illustrative Embodiment II, 100 parts by weight of the blend number 52 from Illustrative Embodiment I was reinforced with 65.6 parts by weight PPG ¼ inch glass fiber strands by melt blending the glass fibers with the polymer blend in the extruder at a temperature of about 240° C. The resulting composition had the following properties:

| | |
|---|---|
| Young's modulus $\times 10^3$, psi | 1078 |
| Yield, psi | 7280 |
| Tensile at Break, psi | 7280 |
| Ultimate Elongation at Break, % | 1.58 |
| Flex Modulus $\times 10^3$, psi | 882 |
| Notched Izod Impact Strength, ft-lbs/inch | 1.27 |

Illustrative Embodiment III

In Illustrative Embodiment III, glass reinforced blends similar to the one prepared in Illustrative Embodiment II were prepared, except that all four major components plus the glass fiber were dry blended together at the same time instead of first preparing the polyblend and then adding the glass fibers.

The various compositions, conditions and test results are presented below in Table 2. In all cases, the resulting polyblends possessed the desired interlocking network structure.

TABLE 2

| Blend No | 56 | 58 |
|---|---|---|
| Component, Parts by Weight | | |
| Block Copolymer | 3.5 | 6.8 |
| Oil | 0.7 | 1.7 |
| Nylon 6 | 15.0 | — |
| Nylon 6-12 | — | 26.1 |
| Polypropylene | 41.0 | 26.1 |
| Glass Fibers | 39.8 | 39.2 |
| Extrusion Temperature, °C | 240 | 240 |
| Properties | | |
| Young's Modulus $\times 10^3$ | 1086 | 801 |
| Yield, psi | 7470 | 7670 |
| Tensile at Break, psi | 7470 | 7670 |
| Ultimate Elongation at Break, % | 1.21 | 1.78 |
| Flex Modulus $\times 10^3$, psi | 862 | 719 |
| Notched Izod Impact Strength, ft-lbs/inch | 1.33 | 1.16 |

Illustrative Embodiment IV

In Illustrative Embodiment IV, various polymer blends containing Nylon 6 were prepared. This embodiment shows that the presence of the block copolymer is essential for the success of the instant invention. All blends were prepared by mixing on the extruder at 230° C. The compositions are presented below in Table 3. (Note, some blends are also presented in Table 1)

Blends 18, 12 and 41 are presented for comparison purposes and contain either Nylon 6 by itself or Nylon 6 with polypropylene, while Blends 14–17 and 43 reveal blends of the present invention having at least two continuous interlocking networks.

TABLE 3

| Blend No. | 18 | 12 | 14 | 15 | 16 | 17 | 41 | 43 |
|---|---|---|---|---|---|---|---|---|
| Component, Parts by Weight | | | | | | | | |
| Block Copolymer | — | — | 4.2 | 8.3 | 12.5 | 25.0 | — | 25.5 |
| Oil | — | — | 0.8 | 1.7 | 2.5 | 5.0 | — | 4.5 |
| Nylon 6 | 100 | 50 | 47.5 | 45 | 42.5 | 35 | 50 | 35 |
| PBT | — | — | — | — | — | — | 50 | 35 |
| Polypropylene | — | 50 | 47.5 | 45 | 42.5 | 35 | — | — |
| Toluene Solubles | | | | | | | | |
| Expected (% w) | 0 | 0 | 5 | 10 | 15 | 30 | 0 | 30 |
| Found (% w) | 1.2 | 3.1 | 4.9 | 10.7 | 14.0 | 28.3 | 0.4 | 29.2 |
| HCl Solubles | | | | | | | | |
| Expected (% w) | 100 | 50 | 47.5 | 45.0 | 42.5 | 35 | 50 | 35 |
| Found (% w) | 98.8 | 17.8 | 45.0 | 42.9 | 47.6 | 28.6 | 2.3 | 35.3 |

The presence (or absence) of a continuous interlocking network was examined by a selective extraction technique. In this technique, the polymer blend is subjected to a 16-hour Soxhlet extraction with hot refluxing toluene. Ideally, the hot toluene should extract the block copolymer and oil, but should not dissolve the PBT or nylon. Then the unextracted portion of the blend is placed in a vessel containing 6 molar hydrochloric acid (HCl) and shaken for about 20 hours at room temperature. The HCl should dissolve the Nylon 6, but not the polypropylene or PBT. The unextracted portion of the blend after each extraction is weighed and the weight loss compared with the expected values.

In Blend 18, 1.2% of the Nylon 6 was soluble in hot toluene compared to an expected 0% (well within the accuracy of the technique). The remainder of the polymer completely dissolved in the HCl.

Extraction of blends 12 and 41 not containing any of the claimed block copolymer reveal the absence of continuous interlocking networks. In Blend 12, 3.1% of the blend was soluble in hot toluene compared to an expected 0%, also well within the accuracy of the technique. However, only 17.8% of the extracted blend was soluble in HCl compared to an expected 50%. This indicates that a large portion of nylon was so encapsulated in the polypropylene as to be inaccessible to the HCl, i.e., there was no continuous network of nylon that would be accessible to the HCl. In Blend 41, 0.4% of the blend of PBT and Nylon 6 was soluble in hot toluene compared to a theoretical 0%. However, only 2.3% of the extracted blend was soluble in HCl compared to an expected 50%, indicating a lack of a continuous interlocking networks since apparently only a small portion of nylon was accessible to the HCl.

Contrary to the results in Blends 12 and 41, the extraction technique reveals the presence of continuous interlocking networks in Blends 14–17 and 43 wherein the block copolymer of the instant invention is employed. For example, in Blend 14, 4.2 parts by weight block copolymer is employed. The toluene extracted 4.9% compared to an expected 5%, and most significantly, the HCl extracted 47.5% compared to an expected 45.0%, all within the accuracy of the technique. This indicates that the nylon was present as a continuous network since apparently all the nylon was accessible to the HCl as would be expected from a completely connected phase. Similar results are shown for the other polymer blends prepared according to the present invention.

Comparative Example 1

In the Comparative Example 1, various blends of Nylon 6 and other engineering thermoplastics were prepared in the absence of the present block copolymer. The various blends are presented below in Table 4 along with individual remarks concerning the blend.

TABLE 4

| Blend No. | Eng. Th. | Wt. Ratio of Nylon 6 to Eng. Th. | Processing Temperature (° C) | Comments |
|---|---|---|---|---|
| 12 | Polypropylene | 1:1 | 235 | Grainy appearance |
| 41 | PBT | 1:1 | 240 | Weak melt hand take off |
| 68 | PBT | 1:1 | 265 | Not strandable |
| 110 | Polycarbonate | 1:3 | 270 | Melt Fracture, Extreme Die Swell Surging |
| 114 | Polyurethane | 3:1 | 240 | Surging, grainy |
| 115 | Polyacetal | 3:1 | 230 | Die swell, Surging, Melt Fracture |
| 116 | PBT | 3:1 | 245 | Die Swell, Slight Melt Fracture |
| 117 | Polycarbonate | 3:1 | 270 | Surging, Gross Melt Fracture, Die Swell |
| 118 | Poly(ether sulfone) | 3:1 | 300 | Slight surging, Strand dimpling (cavitation) Slight Melt Fracture |
| 121 | Fluoropolymer | 3:1 | 300 | Surging extreme, knobby gross profile |
| 176 | Poly(acrylonitrile-co-styrene) | 1:3 | 250 | No comparison made |

What is claimed is:

1. A composition comprising the admixture obtained by initimately mixing about 4 to about 40 parts by weight of a block copolymer, about 5 to about 48 parts by weight of at least one dissimilar engineering thermoplastic, and a polyamide in a weight ratio of polyamide to dissimilar engineering thermoplastic of greater than 1:1, so as to form a polyblend wherein at least two of the polymers have at least partial continuous interlocked networks with each other and wherein:
   (a) said block copolymer comprises at least two monoalkenyl arene polymer end blocks A and at least one substantially completely hydrogenated conjugated diene polymer mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000;
   (b) said polyamide has a molecular weight in excess of about 10,000; and
   (c) said dissimilar engineering thermoplastic resin is capable of forming a continuous structure and is selected from the group consisting of polyolefins, thermoplastic polyesters, poly(aryl ethers), poly(aryl sulfones), polycarbonates, acetal resins, thermoplastic polyurethanes, halogenated thermoplastics, and nitrile barrier resins.

2. A composition according to claim 1 wherein said block copolymer monoalkenyl arene is styrene and said block copolymer conjugated diene is selected from isoprene and butadiene.

3. A composition according to claim 1 wherein said block copolymer has an ABA linear structure.

4. A composition according to claim 1 wherein said block copolymer has a branched structure.

5. A composition according to claim 3 wherein said block copolymer is a selectively hydrogenated block copolymer of styrene and butadiene, said butadiene having a 1,2 content of between about 35% and 55%.

6. A composition according to claim 1 wherein said polyamide is selected from the group consisting of nylon 6, 6:6, 11, 12, 6:3 and 6:12.

7. A composition according to claim 6 wherein said polyamide is nylon 6.

8. A composition according to claim 6 wherein said polyamide is nylon 6:12.

9. A composition according to claim 1 wherein said dissimilar engineering thermoplastic is a thermoplastic polyester.

10. A composition according to claim 9 wherein said thermoplastic polyester is prepared by condensing a dicarboxylic acid with a glycol.

11. A composition according to claim 9 wherein said thermoplastic polyester is poly(butylene terephthalate).

12. A composition according to claim 1 wherein said dissimilar engineering thermoplastic is a polyolefin.

13. A composition according to claim 12 wherein said polyolefin is essentially isotactic polypropylene.

14. A composition according to claim 1 wherein said dissimilar engineering thermoplastic is a poly(aryl ether) or poly(aryl sulfone).

15. A composition according to claim 1 wherein said dissimilar engineering thermoplastic is a polycarbonate.

16. A composition according to claim 1 wherein said dissimilar engineering thermoplastic is an acetal resin.

17. A composition according to claim 1 wherein said dissimilar engineering thermoplastic is a thermoplastic polyurethane.

18. A composition according to claim 1 wherein said dissimilar enginerring thermoplastic is a halogenated thermoplastic.

19. A composition according to claim 18 wherein said halogenated thermoplastic is crystalline polyvinylidene difluoride.

20. A composition according to claim 1 wherein said dissimilar engineering thermoplastic is a nitrile barrier resin.

21. A composition according to claim 20 wherein said nitrile barrier resin has an alpha, beta-olefinically unsaturated mononitrile content of at least 50% by weight.

22. A composition according to claim 1 which contains about 2 to about 80 percent by weight glass fibers.

23. A composition according to claim 1 wherein the block copolymer, polyolefin, and dissimilar engineering thermoplastic are melt blended under essentially isoviscous blending conditions.

24. A composition comprising the admixture obtained by intimately mixing about 4 to about 40 parts by weight of a block copolymer, about 5 to about 48 parts by weight of at least one dissimilar engineering thermoplastic, and a polyamide in a weight ratio of polyamide to dissimilar engineering thermoplastic of greater than 1:1 under essentially isoviscous melt blending conditions so as to form a polyblend wherein at least two of the polymers have at least partial continuous interlocked networks with each other and wherein:

(a) said block copolymer comprises at least two monoalkenyl arene polymer end blocks A and at least one substantially completely hydrogenated conjugated diene polymer mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000;

(b) said polyamide has a molecular weight in excess of about 10,000; and (c) said dissimilar engineering thermoplastic resin is capable of forming a continuous structure and is selected from the group consisting of polyolefins, thermoplastic polyesters, poly(aryl ethers), poly(aryl sulfones), polycarbonates, acetal resins, thermoplastic polyurethanes, halogenated thermoplastics, and nitrile barrier resins.

25. A composition according to claim 24 wherein the viscosity ratio of the viscosity of the block copolymer divided by the viscosity of the polyamide, dissimilar engineering thermoplastic, or mixture of polyamide and dissimilar engineering thermoplastic is between about 0.2 and about 4.0 at the processing temperature Tp.

26. A composition according to claim 25 wherein said viscosity ratio is between about 0.8 and about 1.2.

27. A composition according to claim 25 wherein said processing temperature Tp is between about 150° C and about 400° C.

28. A composition according to claim 1 which contains between about 10 and about 100 parts by weight of a viscosity modifier per 100 parts by weight of said dissimilar engineering thermoplastic.

29. A composition according to claim 28 wherein the viscosity modifier is selected from the group consisting of poly(2,6-dimethyl-1,4-phenylene)oxide and blends of poly(2,6-dimethyl-1,4-phenylene)oxide with polystyrene.

30. A composition according to claim 1 which contains about 2 to about 80 percent by weight of a filler.

31. A composition according to claim 1 which contains about 2 to about 80 percent by weight of a reinforcement.

* * * * *